No. 812,696. PATENTED FEB. 13, 1906.
D. D. STANBRO.
BALING PRESS.
APPLICATION FILED MAY 13, 1905.

9 SHEETS—SHEET 1.

Witnesses

Inventor
D. D. Stanbro,
By Victor J. Evans
Attorney

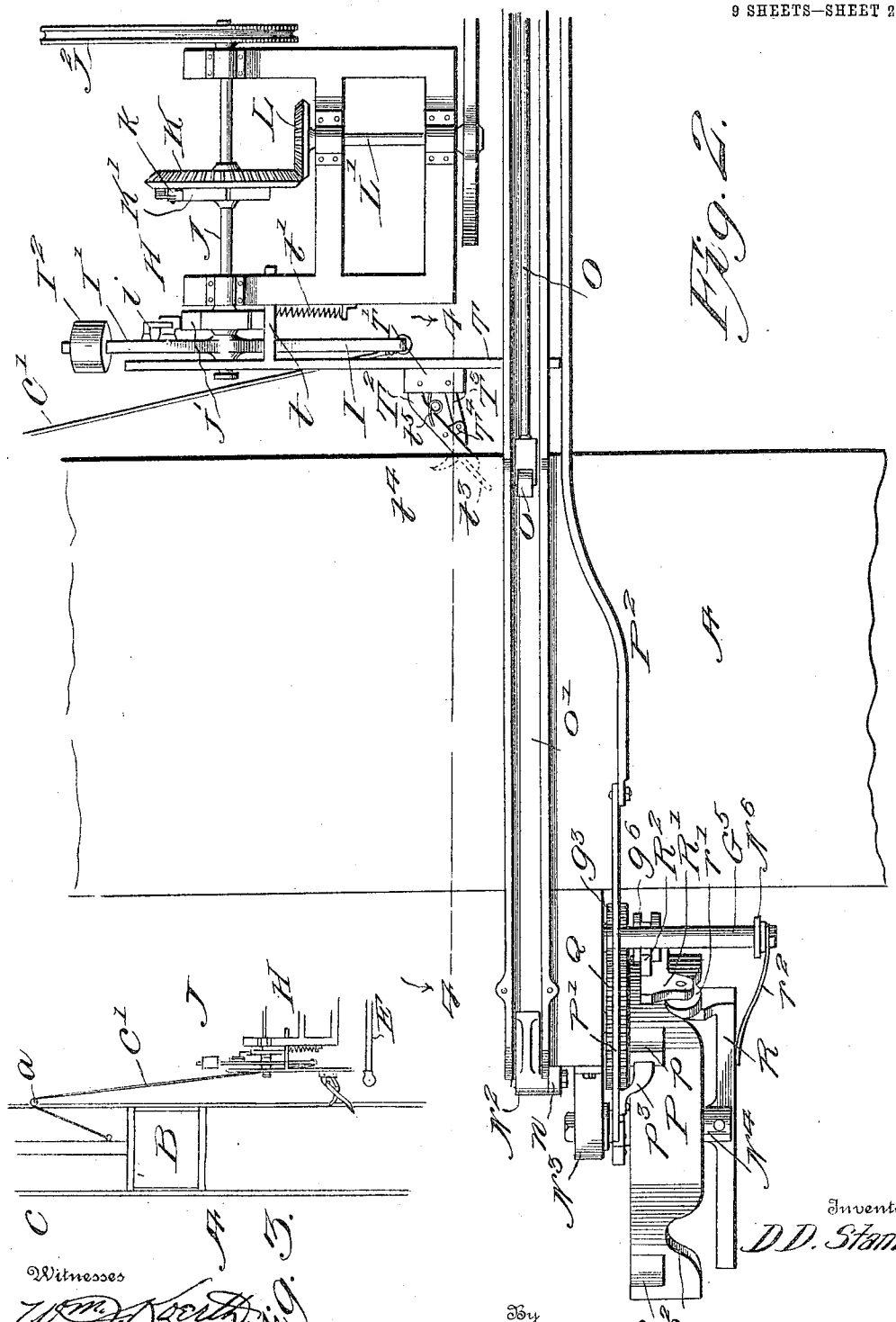

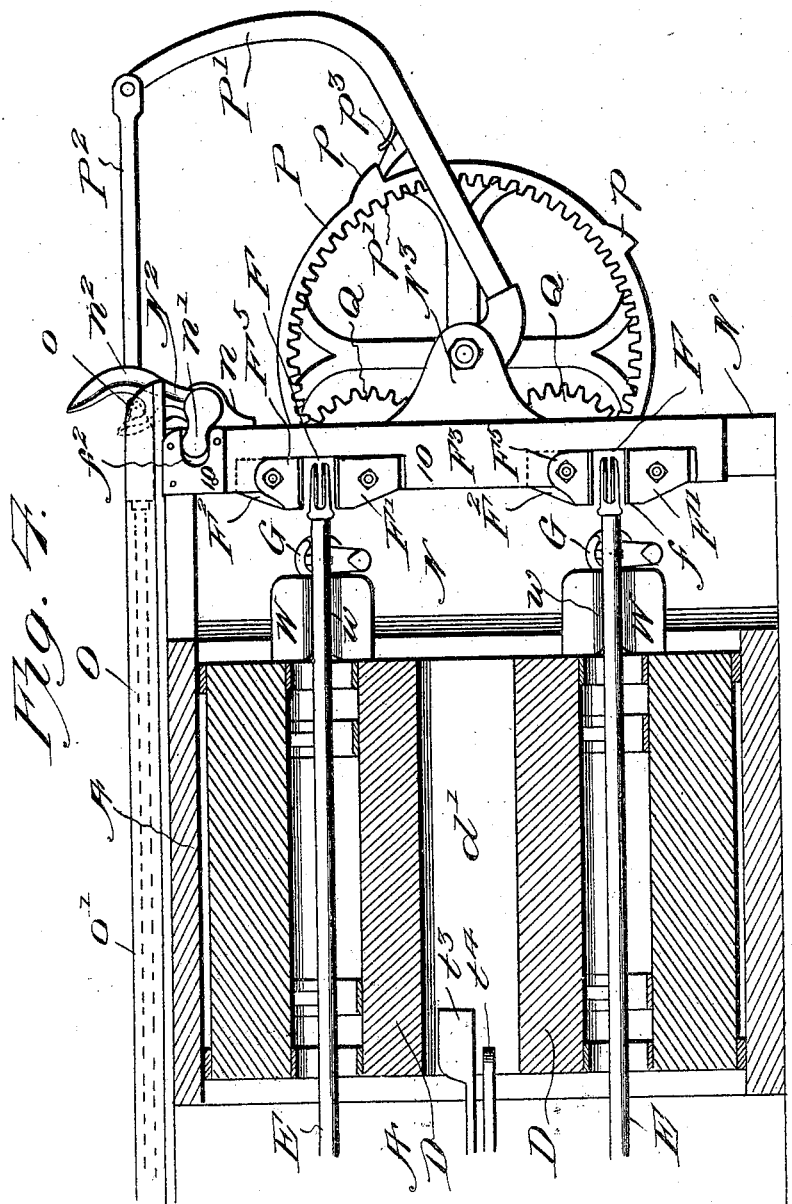

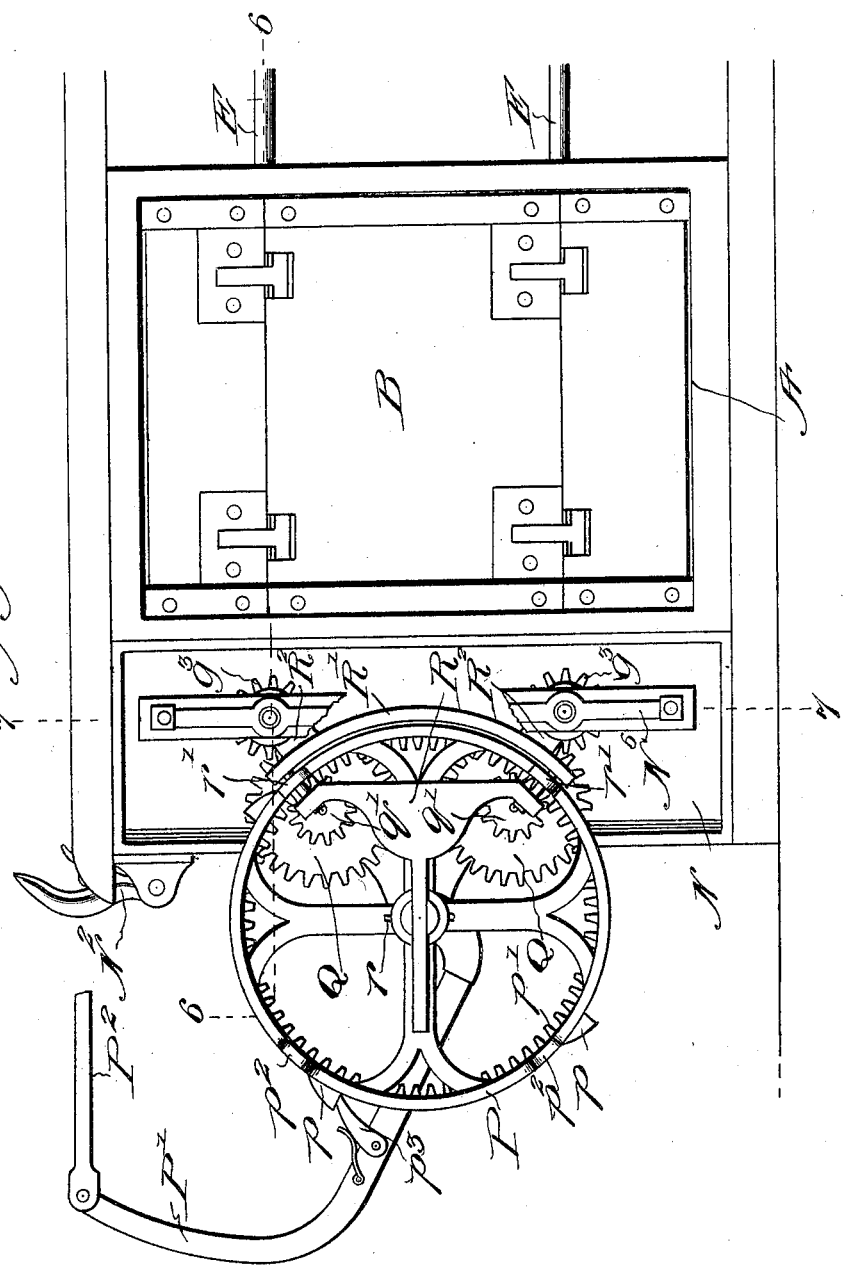

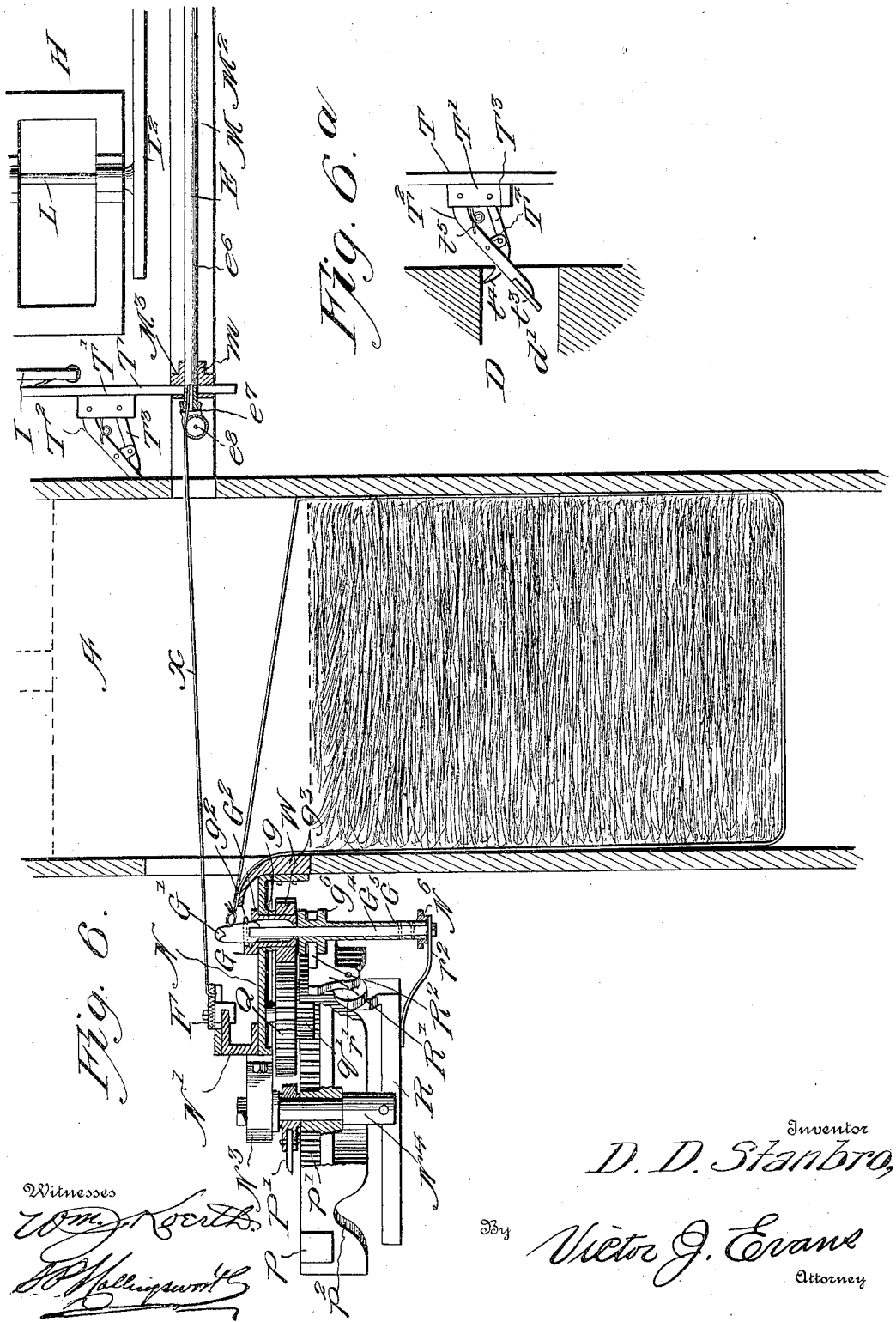

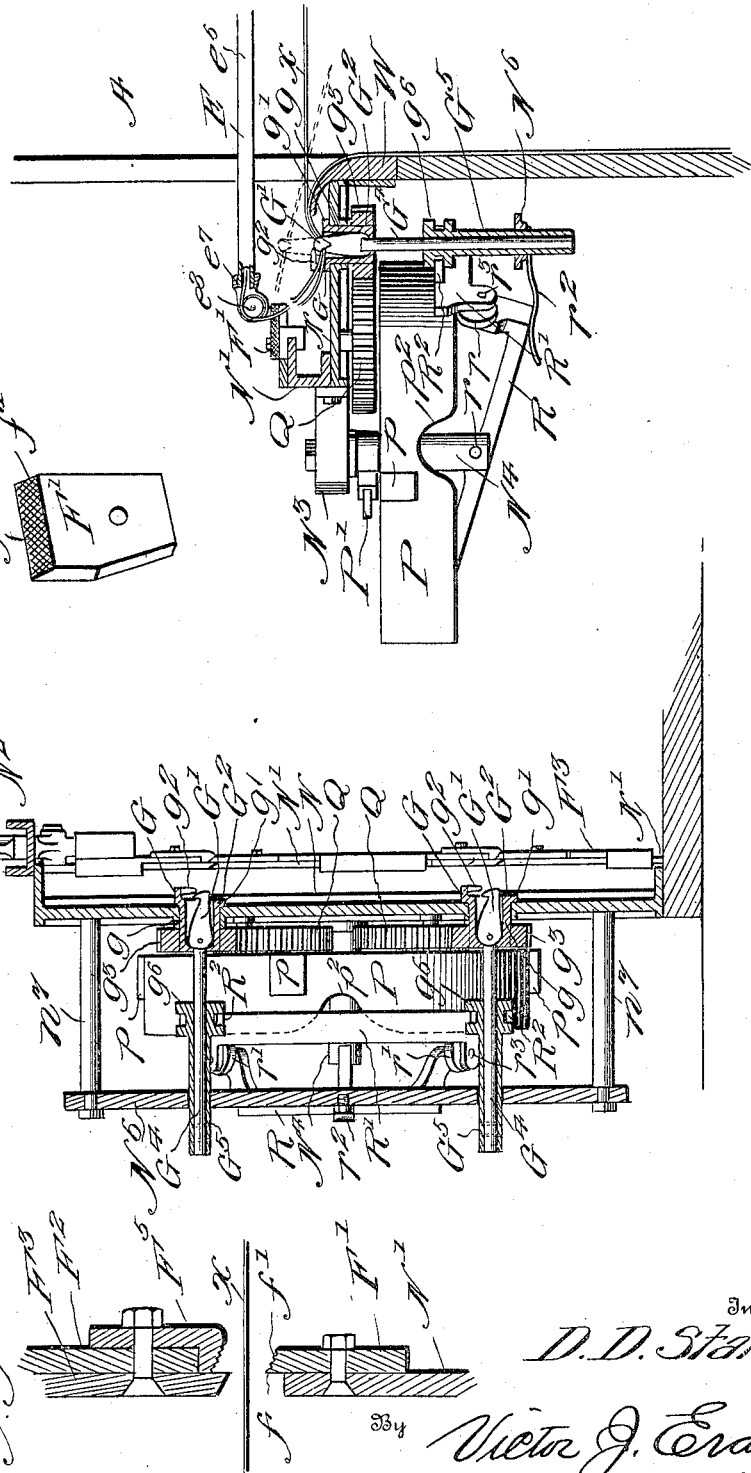

No. 812,696. PATENTED FEB. 13, 1906.
D. D. STANBRO.
BALING PRESS.
APPLICATION FILED MAY 13, 1905.

9 SHEETS—SHEET 8.

Witnesses
Inventor
D. D. Stanbro,
By Victor J. Evans
Attorney

No. 812,696. PATENTED FEB. 13, 1906.
D. D. STANBRO.
BALING PRESS.
APPLICATION FILED MAY 13, 1905.
9 SHEETS—SHEET 9.
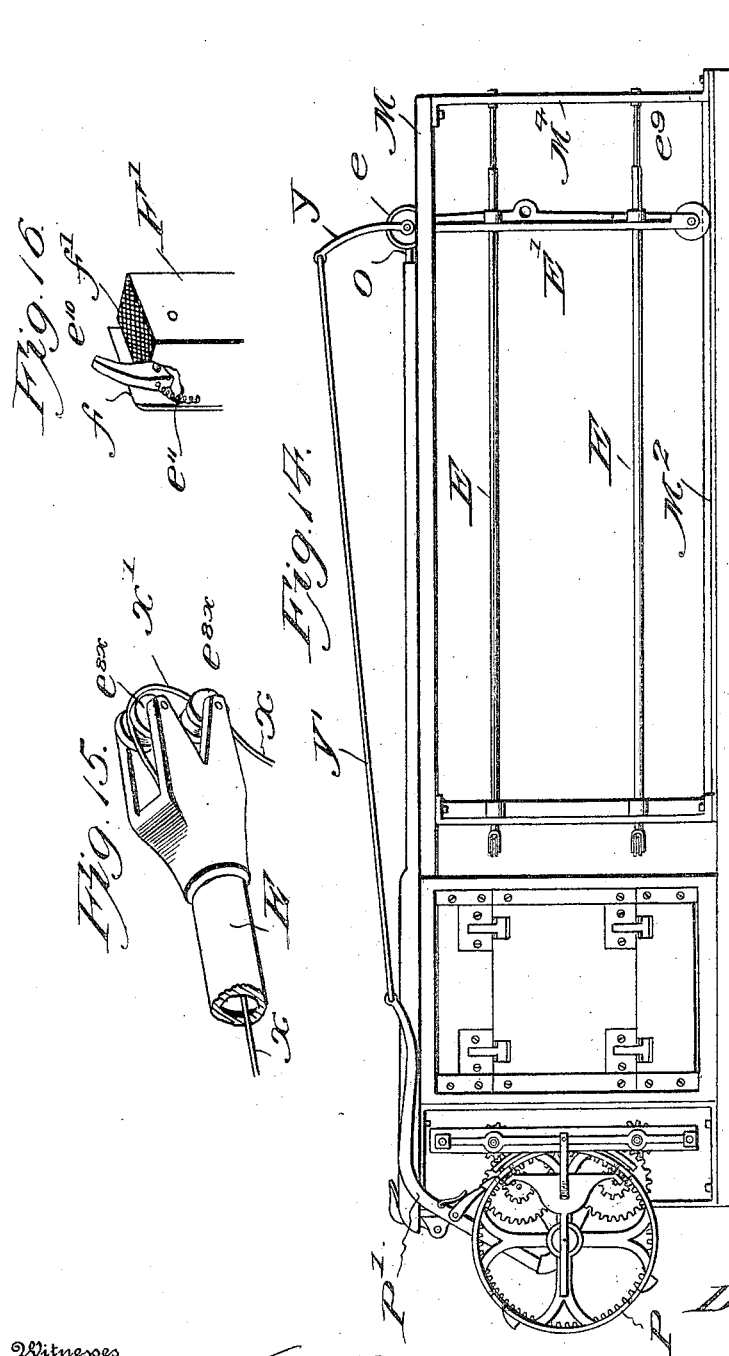
Inventor
D. D. Stanbro,
By Victor J. Evans
Attorney
Witnesses

UNITED STATES PATENT OFFICE.

DONO D. STANBRO, OF LAMAR, MISSOURI.

BALING-PRESS.

No. 812,696.　　　　Specification of Letters Patent.　　　Patented Feb. 13, 1906.

Application filed May 13, 1905. Serial No. 260,304.

*To all whom it may concern:*

Be it known that I, DONO D. STANBRO, a citizen of the United States, residing at Lamar, in the county of Barton and State of Missouri, have invented new and useful Improvements in Baling-Presses, of which the following is a specification.

This invention relates to a wire binding and fastening mechanism for baling-presses which is capable of attachment to any form of press for baling hay, straw, and similar materials.

The type of press to which my invention pertains is that in which means are provided for compressing the material to be bound against the binding-wires, the latter serving as an abutment for the forming bale and which gradually pay out as the size of the bale increases, the wires being carried around two sides and one end of said bale during the pressing operation.

One object of my invention relates to means for storing up power by the movement of the plunger while compressing the bale to subsequently operate the devices for feeding, cutting, and joining the ends of the strands surrounding the bale.

Another object of the invention consists in an automatic tripping device for bringing into operation the stored power after the bale has been compressed and the plunger ceases its movement.

A further object relates to the combined mechanism for cutting and clamping the binding-wires and mechanism for twisting their free ends into knots for retaining the strands in place.

A still further object of the invention resides in a head-block formed of a plurality of separable sections, the opposing faces of which are grooved longitudinally to form when the sections are assembled openings for passage therethrough of the wire-feeding devices, the said sections having connecting means sufficiently secure to enable the head-block to be handled as a unit, but which will yield and permit the sections to separate in order that the binding-wires may escape from said openings.

Other objects of the invention not hereinabove mentioned will be described later and specifically pointed out in the claims.

Figure 1:
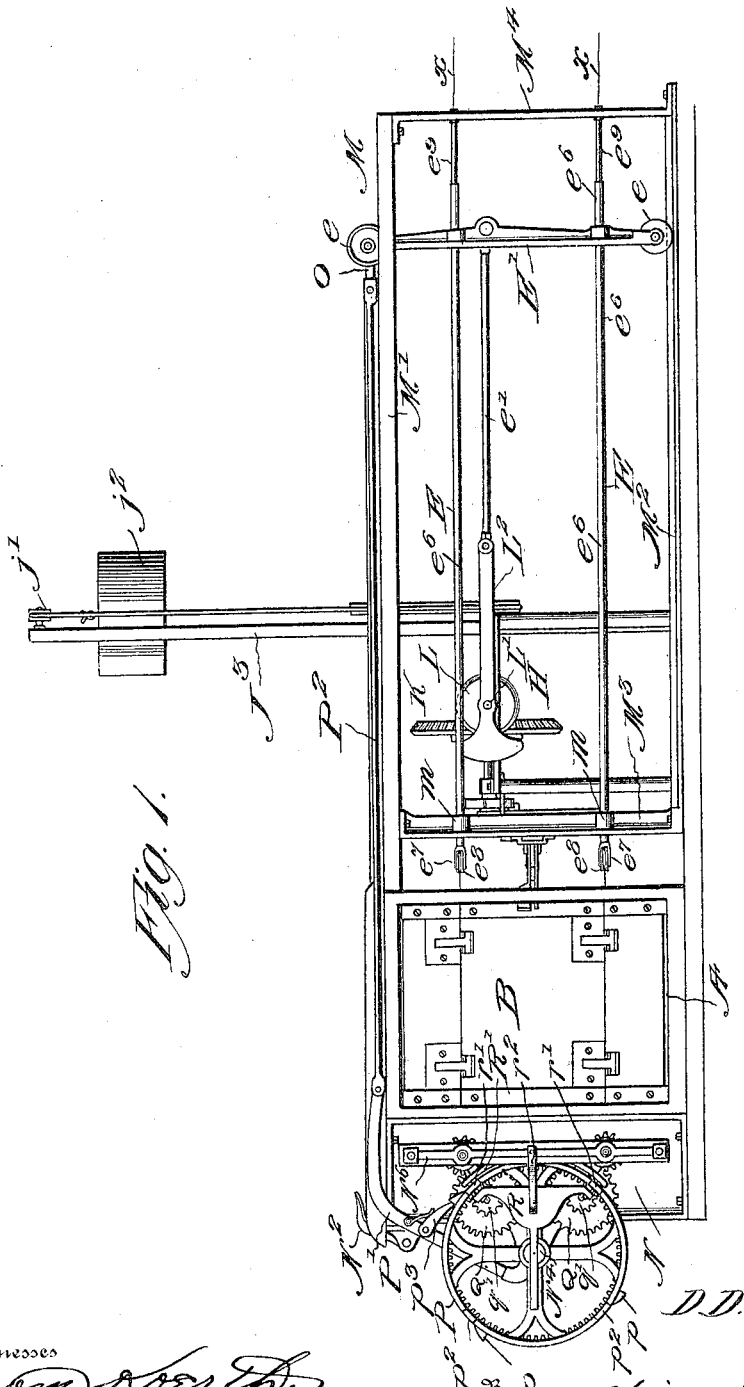
Figure 11:
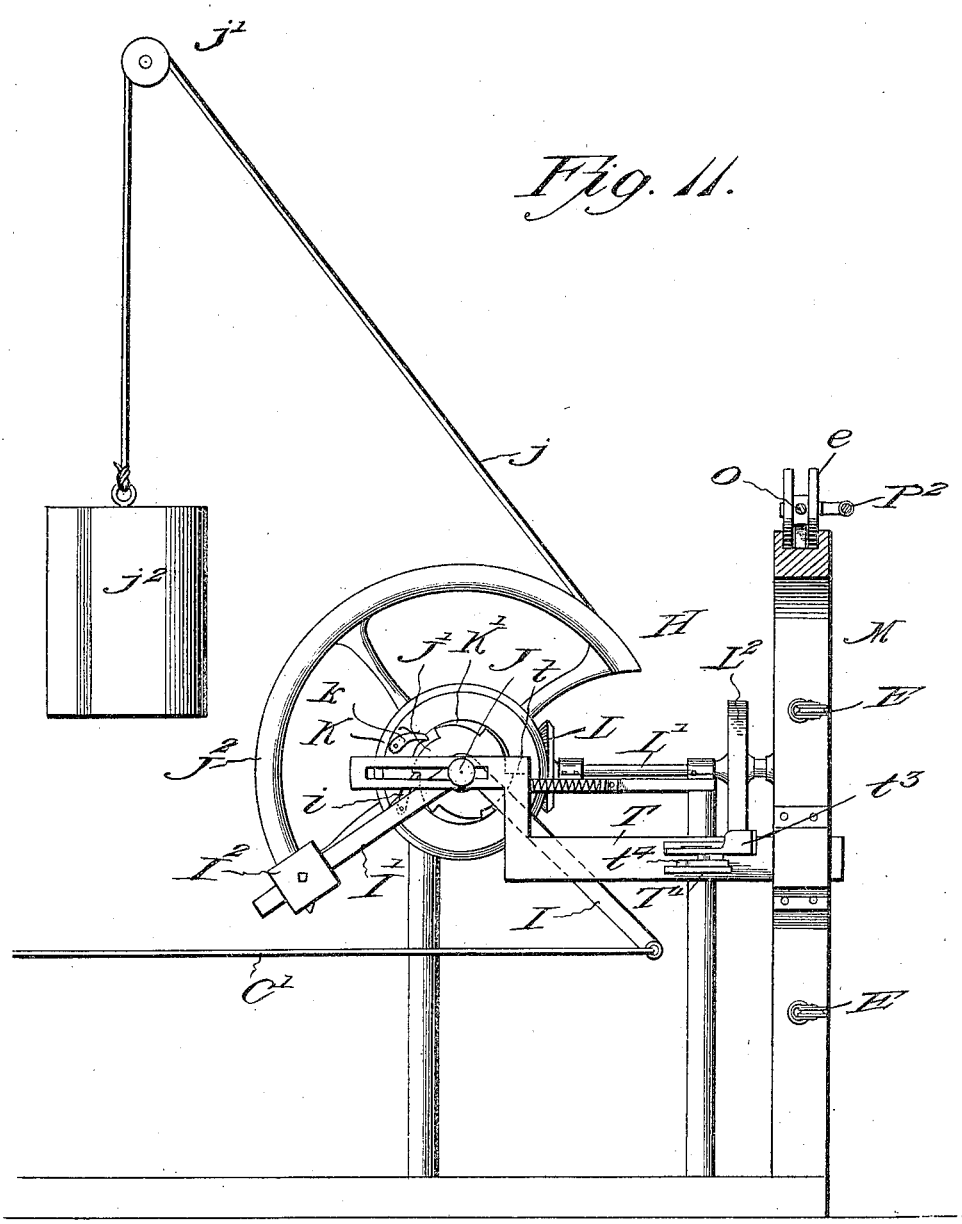
Figure 12:
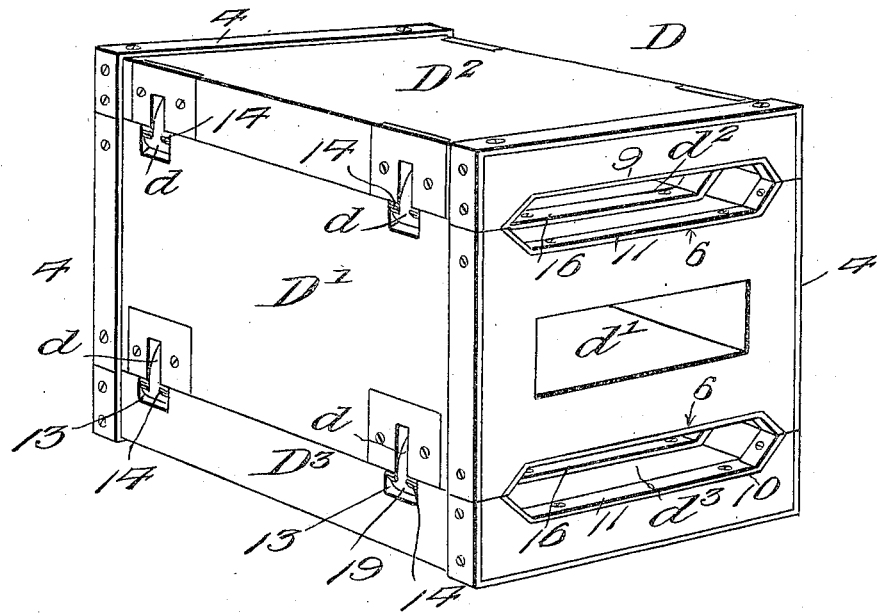
Figure 13:
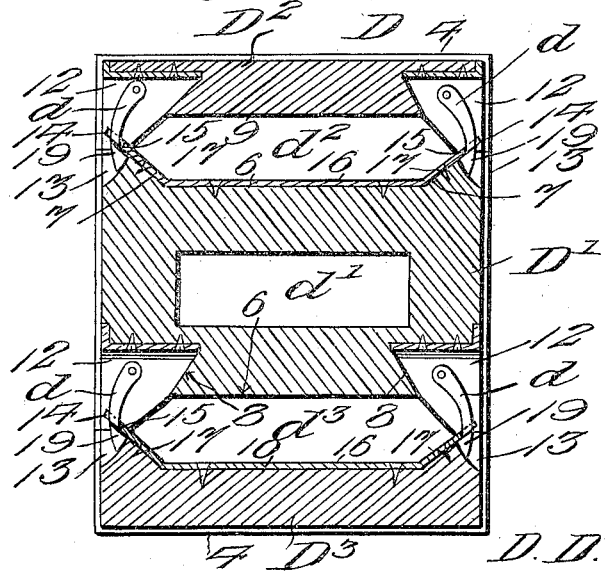

In the accompanying drawings, Figure 1 represents a front elevation of my bale-tying apparatus. Fig. 2 is a plan view of the same, on a larger scale, applied to the baling-chamber of a baling-press. Fig. 3 is a diagram illustrating the baling-chamber with plunger and pitman therein and means operated thereby for storing up the necessary power by which the wire cutting, clamping, and twisting devices are operated. Fig. 4 is a sectional view through the baling-chamber and head-block on the line 4 4, Fig. 2, the knot-forming devices being shown in elevation. Fig. 5 is a front view of the mechanism for operating the wire cutting and twisting or tying devices. Fig. 6 is a horizontal sectional view through the baling-chamber and wire cutting and twisting or tying devices on the line 6 6, Fig. 5. Fig. 6ᵃ is a detail view of the tripping device. Fig. 7 is a view in vertical section on the line 7 7, Fig. 5. Fig. 8 is a view of the knotting or twisting mechanism similar to Fig. 6, but with the parts in different position. Fig. 9 is a perspective view of the stationary knife. Fig. 10 is a sectional view of one of the wire cutters and clamps on the line 10 10, Fig. 4. Fig. 11 is a side elevation of the driving mechanism and trip device. Fig. 12 is a perspective view of the head-block. Fig. 13 is a cross-section of the same. Fig. 14 is a view similar to Fig. 1, showing a modification whereby the needles, cutting-knives are operable by hand instead of the automatic driving mechanism H. Fig. 15 is a perspective detail showing a modified form of guide-roller on the feeding end of the needle. Fig. 16 is a similar view of a modified form of wire catcher and cutter.

A indicates the baling-chamber of a horizontal baling-press of any type, within which chamber a plunger B is adapted to reciprocate by means of a pitman C, operated in a well-known manner. Suitably placed with reference to the baling-chamber A and on one side thereof are two or more horizontal needles E, vertically disposed with relation to each other for carrying the bale-binding wires across the baling-chamber to the opposite side thereof, where are situated the wire cutting and clamping devices F F and wire-twisting heads G G. The driving mechanism for operating the above-enumerated parts is indicated by H. A head-block D of peculiar construction, to be hereinafter described in detail, is placed within the baling-chamber to trip the driving mechanism H and to serve as a guide for the needles E and binding-wires as they are carried to the cutting, clamping, and twisting mechanisms, hereinbefore mentioned, on the opposite side of the baling-chamber.

Attached to the pitman C or to the plunger B is a rope or chain C', passing rearwardly from its attachment to and around a pulley $a$ on the baling-chamber A and thence in a forward direction to a lever I, journaled on the main shaft J. From the hub of the lever I an arm I' extends in an opposite direction and carries a weight $I^2$. During each forward stroke of the plunger the rope C' rocks the lever I, raising the weight $I^2$, which falls as soon as the plunger begins its return stroke, rocking the lever I in reverse direction and taking up the slack in the rope C'. Secured on the shaft J are two ratchet-disks J' and K', the ratchet J' being turned in a forward direction by means of a pawl $i$, pivoted to the arm I', when the lever I is operated on the forward stroke of the plunger B.

K indicates a beveled gear-wheel loosely mounted on the main shaft J next the ratchet-disk K'. A pawl $k$ on the gear K is adapted to engage with the teeth on the ratchet-disk K' and turn said bevel-gear when the shaft J is rotated in reverse direction.

In the construction herein shown and described the main shaft J is arranged to make a half-rotation in a forward direction by the action of the plunger B, three strokes of which are required to accomplish this result. The motion of the shaft is then reversed by means now to be described.

The main shaft J carries on its outer end a grooved segment or wheel $J^2$. A rope or chain $j$, fixed in said groove, passes up and over a guide-pulley $j'$, pivoted to a support $J^3$, and thence down to a weight $j^2$, which tends to rotate the main shaft in a backward direction. A complete forward stroke of the plunger B pulls the rope C' and rocks the lever I, which, through the pawl-and-ratchet connection, turns the shaft J one-sixth of a revolution in a forward direction, winding a portion of the cable $j$ on the segment $J^2$. The main shaft is held in this position by a finger $t$, projecting from the side of the trip mechanism T, engaging a tooth on the ratchet-disk J'. After the third stroke of the plunger the shaft J will have made a half-revolution, winding the rope or cable $j$ about the segment $J^2$ and raising the weight $j^2$ to its full height, ready when released by the trip T to operate the driving mechanism H. The teeth on the ratchet-disk K' during the forward movement of the main shaft slip past the pawl $k$ without engaging it. When, however, the shaft J is reversely turned by the weight $j^2$, the pawl $k$ is caught by one of the teeth of the ratchet-disk K' and the bevel-gear K given a semirotation.

Geared to the bevel-wheel K is a smaller bevel-gear L, mounted on one end of a shaft L', its other end carrying a balanced crank $L^2$, by means of which the needles E are reciprocated when the shaft is turned. The bevel-gear L has one-half as many teeth as the bevel-wheel K. It therefore makes a complete revolution to each semirotation of the larger gear K.

Extending laterally from one side of the baling-chamber A in front of the driving-gear H is a rectangular frame M, the horizontal top and bottom rails of which (indicated by $M' M^2$, respectively) are connected at each end by vertical supports $M^3 M^4$. Bearings $m$ $m$ are formed on the support $M^3$, in which the needles E slide as they are moved through the baling-chamber to the cutting and twisting mechanisms. The outer ends of the needles E are carried by a vertically-disposed carriage E', supported by wheels $e$, movable on tracks attached to the rails $M^3 M^4$. A connecting-rod $e'$ has its ends pivoted, respectively, to the carriage E' near its center and to the crank $L^2$, the rotation of which moves the carriage on the rails, and consequently the needles to and fro through the head-block.

Rigidly connected to the baling-chamber on the side opposite the rectangular frame M is an upright standard N, on which the knives and clamping mechanisms F F are attached and in which the twisting-heads G G rotate, there being a knife and clamp and a twisting-head for each needle. Bolted firmly to the standard N is an upright channel-bar N', to which are fastened the fixed blades F' F' of the cutting-knives F, each blade F' having a cutting edge $f$ and a beveled upper face, roughened, as shown. The movable blades $F^2$ are mounted on a vertically-sliding knife-plate $F^3$, operated by a bell-crank lever $N^2$, pivoted on a bracket $n$, projecting from the channel-bar N'. The upper end of the vertically-sliding plate $F^3$ is socketed at $f^2$ for the rounded end of the shorter arm $n'$ of said bell-crank lever $N^2$, its longer arm $n^2$ being forked and projecting above the top of the baling-chamber in position to be operated by a sliding rod or bar O, traveling in a runway $o'$, on one end of which sliding rod is a roller $o$ of a size to enter between the forked ends of the arm $n^2$. The opposite end of the rod or bar O is fastened to the needle-carriage E' and moves with it. The movable knife-blades $F^2$ above mentioned are each fastened to the knife-plate $F^3$ by means of a bolt passing therethrough and through a clamp-plate $F^5$. The under surfaces of said clamp-plates are roughened and adapted to coact with the roughened surfaces of the fixed blades F' below them to hold the needle ends of the binding-wires after the sections of wire surrounding the bale have been cut by the knives.

The twisting-heads (indicated by G G) are each formed of two principal parts, a horizontally-sliding pivoted hook G' and a rotatable headed sleeve $G^2$. The hooks G' are each pivoted to a stem $G^4$, slidably mounted in said sleeve $G^2$. A socket $G^5$, attached to each stem $G^4$, has collars $g^6$ $g^6$, with which the mechanism for sliding the hook is connected. The forward ends of the sockets $G^5$ are slidingly carried by a support $N^6$, bolted to posts $n^7$ on the standard N. Each sleeve $G^2$ is pivoted in the standard N, its axis intersecting that of the needle coöperating with it and at a right angle thereto. Each sleeve $G^2$ has a cylindrical body $g$, adapted to rotate in a bearing in the standard N, and an enlarged head $g'$, having a wire-grasping hook $g^2$ on its periphery. The sleeves project beyond the face of the standard N for the reception of pinions $g^3$, by means of which they are rotated.

On the outside of the standard N is a bracket $N^3$, to which a short fixed shaft $N^4$ is secured and on which an intermittently-rotatable cam-wheel P is journaled. A series of ratchet-shaped teeth $p$ (four in this instance) are cast with or attached to the outer surface of the rim of the cam-wheel P, its inner surface carrying a gear-ring $p'$, while in its forward edge are formed depressions $p^2$. P' indicates a rocking lever having its bearing on the fixed shaft $N^4$ and extending in an approximately-curved line above the baling-chamber, its free end being there pivoted to a connecting-bar $P^2$, reciprocated by the needle-carriage E', to which it is attached. The rocking lever P' carries a pawl $p^3$, which engages the teeth $p$ of the cam-wheel P and turns the wheel P one-quarter revolution with each movement of the lever.

Projecting forwardly from the standard N are two stud-shafts, parallel with the fixed shaft $N^4$, on which are mounted two gear-wheels Q Q, each wheel Q engaging one of the pinions $g^3$ on the twisting-heads G. A pinion $q'$, fixed to each gear-wheel Q, meshes with the internal gear-ring $p'$ of the cam-wheel P. The gearing is so proportioned that with each one-quarter turn of the cam-wheel P the twisting-heads will make three complete revolutions. A head R, pivoted to vibrate on a vertical pin $r$, passing through shaft $N^4$, carries two rollers $r'$, which bear against the cam edge of the wheel P, their axes being radial to the center of said cam-wheel and at a right angle to each other. As thus disposed the rollers $r'$ when the hooks G' are projected from the twisting-heads and hang downwardly with their points uppermost rest each in one of the depressions $p^2$ in the cam-wheel P, which latter on being turned moves the head R away from the cam-wheel. The rollers ride out of the depressions $p^2$ and run on the edge of the rim while the wheel makes a quarter-turn, after which they drop into other depressions under the pressure of a spring $r^2$ and again project the hooks G'. On the outer ends of the roller-shafts $r^3$ is fixed a segmental bar R', on each end of which is a forked lug $R^2$, which straddles one of the sockets $G^5$ between the collars $g^6$. The vibratory movement of the head R causes the stem $G^4$ and its attached hook to slide in and out of the sleeve $g'$.

The needles E, hereinbefore mentioned, are each constructed of a hollow stem $e^6$, fastened at one end to the carriage E', while its opposite or forward end has a head $e^7$ thereon, in which a serrated guide-roller $e^8$ is pivoted. Screwed to the upright $M^4$ of the frame M are two tubular wire-guides $e^9$, one for each needle, into the hollow stems $e^6$ of which they extend for some distance. A strand of binding-wire is threaded through each tubular guide $e^9$, needle E, and when the machine is in operation its end will be held by the wire-clamp $F^5$.

The trip T consists in part of a plate T', mounted to slide in suitable guides at a right angle to the main shaft J. A finger $t$ projects laterally from the plate T' to engage the ratchet-plate J' under pressure of a spring $t'$. Pivoted to the opposite side of the plate T', near its forward end, are two fingers $T^2$ and $T^3$, pivotally connected by a link $T^4$. The finger $T^2$ has a flattened end $t^3$ to bear against the hay or other material being packed, whereas the end of the finger $T^3$ is hooked, as at $t^4$, to be caught at the proper time by the head-block D and trip the driving mechanism H. A spring $t^5$ serves to keep the finger $T^2$ in contact with the bale.

Bolted to the inner edge of the standard N or other suitable fixed part of the machine are two shields W, which curve rearwardly and outwardly opposite the twisting-heads G. These shields are centrally grooved at $w$ to hold the strands of wire that pass around the bale and to the clamping and twisting mechanism. Their purpose is to prevent chafing and wear of the frame by the wire, to prevent hay, straw, &c., from getting in the twisting-heads, and also to serve as guides to hold the wire strands in position while the ends of the wire are being fastened to the twisting-heads.

The block D consists of an intermediate section D' and upper and lower sections $D^2$ and $D^3$, held in movable relation thereto. The block may be constructed of metal or wood or a composition of both, or in some instances compressed material may be employed. When the block is formed of wood, metallic binding-straps 4 are secured to the corner edges. The section D' is centrally cored out or has an opening $d'$ extending therethrough from end to end to lighten the same and disengage the tripping mechanism T. The upper and lower sides of said section are constructed with channels 6 extending fully through the opposite ends. The upper channel 6 has upwardly and outwardly inclined side walls 7, and the lower channel is formed with downwardly and outwardly inclined side walls 8. The top section $D^2$ has a lower channel 9 to coincide with the channel 6, and the bottom section 3 has an upper channel 10 to coöperate with the channel 6 in the lower part of said section D'. The channels 9 and 10 also have inclined side walls, so that when the sections are assembled, as shown in Figs. 12 and 13, baling-wire or strand-openings $d^2$ and $d^3$ will be formed having the side walls thereof converging toward the joints between the several sections. By this means the baling wires or strands inserted by the needles E through the openings $d^2$ $d^3$ will be guided toward the joints between the sections without catching on angular projections or shoulders, and which would result if the ends of the said openings were arranged at right angles to the bases of the channels. At opposite ends the openings $d^2$ $d^3$ have metallic wear-strips secured thereover to prevent wire or other strands from grooving or abrading the sections, said strips 11 being preferably formed of hard metal.

The opposite sides of the sections $D^2$ and D' have metallic sockets 12 let thereinto, the sockets of the section D' being adjacent to the lower side edges thereof. In the upper edges of the opposite sides of the sections D' and $D^3$ recesses 13 are formed, and projecting over the upper portions of said recesses are forks 14, having shoulders 15, which are secured to or form a part of metallic strips 16, secured in and extending transversely across the channels in the sections D' and $D^3$, the extremities 17 of the strips being disposed at angles of inclination to correspond to the side walls of the channels. Loosely depending from and pivoted in the sockets 12 are dogs or latches $d$, one in each socket, the said dogs being secured at their upper ends and having inwardly-extending shouldered noses 19 at their lower ends to engage the shoulders 15 of the forks 14, the noses 19 being of greater width than the remaining portions of the dog, as clearly shown by Fig. 1, so that the sections D', $D^2$, and $D^3$ will not become disengaged during the operation of the block except when pressure of the baling wires or strands is brought to bear against the dogs $d$ to move the latter outwardly and release the noses thereof from the shoulders of the forks. The inner edges of the sockets are also inclined or beveled to correspond with the size of the channels adjacent to which they are located, and the forks 14 are arranged at such an elevation at their upper surfaces as to be in a plane coincident with the upper surfaces of the sections D' and $D^3$, respectively.

The side walls of the channels are located inwardly a distance from the opposite sides of the sections to prevent the baling wires or strands inserted through the openings $d^2$ $d^3$ from engaging the dogs which are located outwardly beyond the terminals of the said channels. It will be understood, however, that when the baling wires or strands are brought into close engagement with the dogs, when the head-block arrives at a certain position relatively to the feeding means for said wires or strands, the latter will be forced outwardly from the forward side of the head-block, which is in rear of the finished bale. If the head-block be pushed through the baling-chamber the strands for the following bale will pass from the openings $d^2$ $d^3$ and out of the head-block at its rear. The dogs are heavy enough to gravitate and resume a normal locking position after the baling wires or strands are released from the block. When the wires or strands move outwardly through one side of the block, the dogs at the opposite side of said block serve as hinge connections and maintain their engagement with the forks, the inner edges of the shouldered noses of the dogs and the adjacent walls of the recesses 13 being shaped in such manner as to permit hinge movement of the dogs without causing a disengagement of said dogs from the forks.

The operation is as follows: Assuming the parts to be in the position illustrated by Figs. 1, 2, and 3, with the plunger drawn back, the baling-chamber empty, and the binding-wires X stretched across the chamber from the clamps F to the needles E, a quantity of material—hay, for instance—is placed in the baling-chamber and the plunger advanced. The hay will be forced forward against the binding-wires, which, while yielding under the pressure, are held taut by a suitable tension on the needles. The forward movement of the plunger draws on the rope C', rocking the arm I and turning the shaft J one-sixth of a revolution, the weight $j^2$ being thereby raised one-third its height. The plunger on its return movement slackens the rope C', which is taken up by the lever I under the influence of its attached weight $I^2$. An additional quantity of hay is placed in the baling-chamber and the operation repeated, the shaft J being turned an additional one-sixth revolution or one-third by the two movements. The forming bale, increasing in size, continually draws on the binding-wire which lies around the end of the bale constituting an abutment against which the bale is compressed. After the third instalment of hay has been placed in the baling-chamber the head-block carried forward by the plunger gives the bale its final compression and stops in the position represented by dotted lines in Fig. 6, and the weight $j^2$ is at the same time raised to its highest position. During the formation of the bale the finger $T^2$ has been held in contact therewith by the spring $t^5$. As the head-block moves forward the fingers $T^2$ $T^3$ are carried by the spring $t^5$ into the opening $d'$ in the block, and the hook $t^4$ on the finger $T^3$ is caught by the head-block and slides the trip T, disengaging the finger $t$ from the ratchet-plate J' and starts the driving mechanism H. The shaft J being now free to turn, it is given a semi-rotation in opposite direction by the weight $j^2$, the bevel-gear K moving with it. The crank $L^2$ is thus given a complete rotation, which through the connecting-rod $e'$ draws the needle-carriage E' toward the baling-chamber and then pushes it back to the point from whence it started. The forward movement of the carriage E' is the beginning of the operation for securing the wire about the bale. The needles E are carried through the passages $d^2$ $d^3$ in the head-block to the position shown in Figs. 4 and 8, carrying the strands of wire across the fourth side of the bale and over the hooks G' to the cutting and clamping mechanisms F. The rocking lever P' is also carried by the connecting-bar $P^2$ until the pawl $p^3$ engages the next tooth $p$ on the cam-wheel P. (See Figs. 4 and 5.) The sliding rod O moves forward at the same time, and when near the end of its movement the roller $o$ thereon enters between the forked end of the lever $N^2$ and rocks it, raising the knife-plate $F^3$, that the strands of wire may pass between the cutting-blades $F'$ $F^2$. The carriage E' having by this time reached the limit of its forward movement begins its return as soon as the crank $L^2$ crosses the center of the shaft L'. The sliding rod O is withdrawn from the fork of the lever $N^2$, rocking it and pushing down the knife-plate $F^3$, cutting the wire strands and clamping the ends next the needles. The rocking lever as it moves back turns the cam-wheel P one-quarter of a revolution. The first action of the cam-wheel P is to lift the rollers $r'$ out of the depressions $p^2$ and draw the hooks G' into the sleeves $G^2$, pulling the severed ends of the wires with them. (See Fig. 8.) The twisting-heads G immediately begin to rotate, the hooks $g^2$ thereon grasping the free ends of the wire strands and wrapping them around those portions of the wire which encircle the bale, the guard-plates W holding these wires in such position that the wrapping may be readily accomplished. Just as the carriage reaches its outermost position the cam-wheel P completes its movement, bringing a new set of depressions in line with the rollers $r'$, which drop into them and under the force of the spring $r^2$, thereby pushing out the hooks G' from the sleeves $G^2$ and release the fastened ends of the binding-strands. The return of the needles to their position of rest leaves new strands in position for the next bale, as will be clearly seen in Fig. 6. The strands of wire around the bale pass out of the head-block D between the strands, as hereinbefore described. The head-block is then removed, and the machine is ready for another bale.

In the modification shown in Fig. 14 the automatic driving mechanism H is dispensed with and in lieu thereof a handle or hand-lever Y is connected to the carriage E', being shown in the present instance attached to the shaft or axle of the upper rollers $e$, and from said lever extends a rod Y', connecting the same with the rocking lever P', said rod Y' taking the place of the bar $P^2$. By this means the mechanism may be manually operated, the operator grasping the handle or lever Y and reciprocating the carriage E, thereby simultaneously moving rod O to actuate the cutting devices and cam-wheel P to actuate the twisters, as will be readily understood.

Each needle E may be provided at its feeding end with a pair of rollers $e^{8\times}$ to guide the wire to form a bight or loop X', as shown in Fig. 15, and, as shown in Fig. 16, each cutter F' may carry a pivoted catch $e^{10}$, normally retained in operative position by a spring $e^{11}$. When the lever moves forward, the looped end of the wire will be caught by the catch $e^{10}$ and held until engaged by the cutting and clamping mechanism F.

Having thus fully described the invention, what is claimed as new is—

1. A baling-press having reciprocating parts, mechanism for feeding wire to said press, mechanism for cutting the wire, mechanism for joining the ends of the cut-off portion of the wire, and means operated by said reciprocating parts for storing up power to actuate said mechanisms.

2. A baling-press having a reciprocating plunger and pitman, mechanism for feeding wire to said press, mechanism for cutting off a portion of the wire, mechanism for joining the ends of the cut-off portion of the wire, means operated by one of said reciprocating parts for storing up power to actuate said mechanisms, and a tripping device adapted to be disconnected by the movement of said plunger to render said stored power active.

3. A baling-press having a reciprocating plunger and pitman, combined with a head-block, mechanism for feeding wire to said press mechanism for cutting off a portion of the wire, mechanism for joining the ends of said cut-off portion of the wire, means operated by one of said reciprocating parts for storing up power to actuate said feeding, cutting and joining mechanisms, and a tripping device adapted to be engaged by said head-block for releasing said stored power.

4. A baling-press having reciprocating parts, combined with mechanism for feeding wire to said press mechanism for cutting off a portion of the wire, mechanism for joining the ends of said cut-off portion of wire, a rock-shaft, a lever loose on said shaft, a ratchet device between said lever and shaft, a power-storing device operated to store up power by the shaft, means connected to said reciprocating parts and to the lever for rocking the aforesaid shaft to store up power by means of which said mechanism is actuated, and means also operated by the reciprocating parts for setting said power-storing device into action for actuating said mechanisms.

5. A baling-press having reciprocating parts, mechanism for feeding wire to said press, mechanism for cutting off a portion of the wire, mechanism for joining the ends of said cut-off portions of wire, a rock-shaft, a lever loose on said shaft, a ratchet connection between said lever and shaft, a tripping device adapted to engage said ratchet connection, a power-storing device actuated to store up power by the shaft and release for the utilization of said power by the movement of said reciprocating parts, and a rope or its equivalent connected to said reciprocating parts and to the lever for rocking said shaft to operate said power-storing device to store up power for actuating said mechanisms.

6. A baling-press having reciprocating compressing parts, combined with wire feeding, cutting and joining mechanisms operated by stored power, a rock-shaft, a lever adapted to rock said shaft in one direction, means for storing power attached to said shaft, and a rope or its equivalent connected to said reciprocating parts and to the lever for rocking said shaft to store power by means of which said mechanism is actuated.

7. A baling-press having reciprocating parts including a plunger, sets of wire feeding, cutting and joining devices adapted to be operated by stored power, a rock-shaft, a lever adapted to rock said shaft in one direction, power-storing means attached to said shaft and operatively connected with said wire feeding, cutting and joining devices, a rope or its equivalent connected to said reciprocating parts and to the lever for rocking said shaft to actuate said power-storing means for storing up power, and a tripping device for holding said power-storing device inactive and adapted to be released by the action of the plunger.

8. A baling-press having bale-compressing mechanism, devices for applying and fastening wire about a compressed bale, mechanism for operating said devices, means operated by the bale-compressing mechanism for storing power, and a trip actuated by said bale-compressing mechanism to release said stored power and drive said wire-fastening devices.

9. Combined in a bale-wiring mechanism, a fixed knife and wire-clamp, a movable knife and wire-clamp, a wire-twisting head, and a shield to protect said twisting-head by partly surrounding it.

10. Combined in a bale-wiring mechanism, a wire-twisting head, a wire-holding hook adapted to slide longitudinally into and out of said twisting-head, and a wheel having cams thereon for causing the hook to slide, and also means for rotating the twisting-heads.

11. Combined in a bale-wiring mechanism, wire-twisting heads, wire-holding hooks adapted to slide into and out of said twisting-heads, an intermittently-rotatable wheel having a series of cams on one edge, and teeth on its periphery and carrying a gear-ring, means operated by the cams for sliding the hook, gearing turned by the gear-ring for rotating said twisting-head, and a rocking lever adapted to engage said peripheral teeth and turn the wheel.

12. A baling-press having reciprocating parts, wire feeding, cutting and fastening devices, a head-block moved by said reciprocating parts, means operated by said reciprocating parts for storing power to be used in driving said wire feeding, cutting and fastening devices, and a tripping device actuated by said head-block for rendering said stored power active.

13. Combined in a bale-wiring mechanism, wire cutting and clamping devices, wire-twisting devices, wire-feeding needles, a carriage carrying said needles, mechanism for reciprocating said carriage and needles, and means operated by the travel of said carriage to actuate the devices for cutting, clamping and twisting the wires.

14. Combined in a bale-wiring mechanism, tubular wire-feeding needles, a carriage carrying said needles, a supporting-frame for the carriage and needles, and hollow wire-guides attached to said frame and extending into said needles.

15. Combined in a bale-wiring mechanism having devices for feeding, cutting and clamping wires and twisting the ends thereof, a shaft, a lever thereon and connected thereto by a ratchet device, a bale-compressing mechanism adapted to move the lever and rotate the shaft in one direction, means for storing power attached to said shaft to turn it in opposite direction, a gear-wheel connected by a clutch to said shaft when turned by said stored power, and mechanism for operating said feeding, cutting, clamping and twisting devices, when said gear-wheel is turned.

16. A head-block for a baling-press or the like, composed of separable parts, connected by movable dogs and having baling wire or strand openings extending therethrough, the dogs being operative to release the parts by the bale-securing wires or strands moving outwardly from the block.

17. A head-block for a baling-press or the like, composed of separable sections having bale-securing wire or strand openings extending therethrough, with outlets at opposite sides of the block, and means for holding the parts of the block in assembled relation.

18. A head-block for a baling-press or the like, composed of separable parts and having openings extending therethrough from end to end for the reception of bale-securing wires or strands, the said openings having outlets at opposite sides and the walls thereof inclining outwardly toward the joints between the parts.

19. A head-block for baling-presses and the like, composed of a series of separable sections having bale-securing wire or strand openings extending therethrough from end to end, and gravitating securing devices for normally holding the sections of the block in connected relation.

In testimony whereof I affix my signature in presence of two witnesses.

DONO D. STANBRO.

Witnesses:
A. T. McADOW,
S. L. HACKNEY.